United States Patent
Iwaji et al.

(10) Patent No.: US 8,258,732 B2
(45) Date of Patent: Sep. 4, 2012

(54) DRIVE SYSTEM OF SYNCHRONOUS MOTOR

(75) Inventors: Yoshitaka Iwaji, Hitachinaka (JP);
Yasuhiko Kokami, Takasaki (JP);
Minoru Kurosawa, Yoshii (JP)

(73) Assignee: Renesas Electronics Corporation, Kanagawa (JP)

( * ) Notice: Subject to any disclaimer, the term of this patent is extended or adjusted under 35 U.S.C. 154(b) by 673 days.

(21) Appl. No.: 12/367,036

(22) Filed: Feb. 6, 2009

(65) Prior Publication Data

US 2009/0200971 A1 Aug. 13, 2009

(30) Foreign Application Priority Data

Feb. 7, 2008 (JP) ................................. 2008-027350

(51) Int. Cl.
*H02P 6/04* (2006.01)
*H02P 6/00* (2006.01)
*H02P 6/18* (2006.01)

(52) U.S. Cl. ......... 318/400.11; 318/400.01; 318/400.34; 318/400.35

(58) Field of Classification Search ............ 318/400.01, 318/400.11, 400.34, 400.35
See application file for complete search history.

(56) References Cited

U.S. PATENT DOCUMENTS

| | | | | |
|---|---|---|---|---|
| 5,198,733 A * | 3/1993 | Wright | ..................... | 318/400.34 |
| 5,254,914 A * | 10/1993 | Dunfield et al. | ......... | 318/400.34 |
| 5,949,204 A * | 9/1999 | Huggett et al. | .......... | 318/400.02 |
| 6,462,492 B1 * | 10/2002 | Sakamoto et al. | ....... | 318/400.32 |
| 6,555,988 B2 * | 4/2003 | Masaki et al. | ................ | 318/721 |
| 6,628,099 B2 * | 9/2003 | Iwaji et al. | .................... | 318/700 |
| 6,639,377 B2 * | 10/2003 | Iwaji et al. | .................... | 318/700 |
| 7,023,158 B2 * | 4/2006 | Hirono | ..................... | 318/400.11 |
| 7,095,204 B2 * | 8/2006 | Lee et al. | ....................... | 318/700 |
| 7,141,949 B2 * | 11/2006 | Harwood | ................. | 318/400.35 |
| 7,180,263 B2 * | 2/2007 | Maeda et al. | .................. | 318/719 |
| 2002/0012932 A1 * | 1/2002 | Wang | ................. | 435/6 |
| 2003/0057912 A1 * | 3/2003 | Iwaji et al. | ..................... | 318/700 |
| 2003/0071588 A1 * | 4/2003 | Iwaji et al. | ..................... | 318/254 |
| 2006/0044848 A1 * | 3/2006 | Suzuki et al. | ................... | 363/37 |
| 2007/0216325 A1 | 9/2007 | Fukamizu et al. | | |
| 2008/0018279 A1 * | 1/2008 | Fukamizu et al. | ............ | 318/432 |

FOREIGN PATENT DOCUMENTS

| | | |
|---|---|---|
| JP | 9-327194 | 12/1997 |
| JP | 2000-232797 | 8/2000 |
| JP | 2001-231284 A | 8/2001 |
| JP | 2001-275387 | 10/2001 |
| JP | 2003-189674 | 7/2003 |
| JP | 2004-166500 | 6/2004 |
| JP | 2006-94623 A | 4/2006 |
| JP | 2007-252066 A | 9/2007 |

* cited by examiner

*Primary Examiner* — Bentsu Ro
*Assistant Examiner* — Gabriel Agared
(74) *Attorney, Agent, or Firm* — Mattingly & Malur, PC

(57) ABSTRACT

A drive system of a permanent magnet motor is constituted of a mode switching trigger generator which monitors a state of a permanent magnet motor and issues a mode switching trigger, a conduction mode determining unit which receives the mode switching trigger and switches the mode of the permanent magnet motor, and a PWM generator which outputs a PWM signal to an inverter in accordance with the output of the conduction mode determining unit. The mode switching trigger is generated on condition that the speed electromotive force of the permanent magnet motor exceeds a constant or variable threshold value.

9 Claims, 19 Drawing Sheets

SAMPLE HOLD OF AVERAGE VALUE IN PULSE OUTPUT PERIOD

SAMPLE HOLD OF APPROXIMATE FINAL VALUE IN PULSE OUTPUT PERIOD

DRIVE SYSTEM OF SYNCHRONOUS MOTOR

CROSS-REFERENCE TO RELATED APPLICATION

The present application claims priority from Japanese Patent Application No. JP 2008-027350 filed on Feb. 7, 2008, the content of which is hereby incorporated by reference into this application.

TECHNICAL FIELD OF THE INVENTION

The present invention relates to a technique used for a rotation speed control of a motor drive unit and an integrated circuit device for driving a motor, for example, a hard disk driver (HDD), an optical disk driver, a spindle motor, a fan, a pump, a compressor and others.

BACKGROUND OF THE INVENTION

A small-sized and highly-efficient permanent magnet motor (synchronous motor) has been widely used in a spindle motor of a HDD device and a motor drive unit of a fan, a pump and others.

However, since position information of a rotator of a motor is necessary for driving a permanent magnet motor, a position sensor therefor is required. In recent years, a sensorless control in which rotation and torque control of a permanent magnet motor is performed without using the position sensor has been widely prevalent.

By the practical use of the sensorless control, the reduction of the cost required for the position sensor (cost required for the sensor itself, wiring of the sensor and others) and the size reduction of the device can be achieved. In addition, since the sensor is unnecessary, such an advantage can be achieved that the use under adverse environmental conditions is possible.

At present, the sensorless control of a permanent magnet motor has adopted a method in which the induced voltage (speed electromotive force) generated by rotating a rotator of the permanent magnet motor is directly detected and used as the position information of the rotator to drive the permanent magnet motor, and a position estimation technique in which a rotator position is estimated and computed from an equation model of a target motor.

These sensorless controls have a significant problem. It is a position detection method at the time of low-speed driving. Since most of the sensorless controls put into practical use at present are based on the induced voltage generated by the permanent magnet motor, the sensitivity is decreased in a stopping or low-speed range where the induced voltage is low, and there is the possibility that the position information is buried in the noise. Various solutions have been suggested for this problem.

In the invention described in Japanese Patent Application Laid-Open Publication No. 9-327194 (patent document 1), the synchronous drive which is an open-loop control and the induced voltage detection are performed in combination in the stopping or low-speed range, thereby improving the drive performance in the low-speed range.

In the invention described in Japanese Patent Application Laid-Open Publication No. 2001-275387 (patent document 2), two phases of a three-phase stator winding are sequentially selected to apply a pulsed voltage, the induced voltage of a non-conduction phase induced by the pulsed voltage (transformer electromotive force in this case) is detected, and the position of a rotator is estimated from the voltage pattern thereof. This is because, since the saturation state of a magnetic circuit is changed depending on the position of the rotator, the induced voltage in accordance with the position is generated in the non-conduction phase. Therefore, in the invention described in the patent document 2, the position information can be acquired even in the complete stopping state.

In the invention described in Japanese Patent Application Laid-Open Publication No. 2003-189674 (patent document 3), the method of the patent document 2 is partially adopted at the time of activation (acceleration), and the acceleration is made steadily while confirming the position of a rotator.

In the invention described in Japanese Patent Application Laid-Open Publication No. 2000-232797 (patent document 4), the position information is obtained by detecting "neutral point potential" which is the potential at the connecting point of a three-phase stator winding. Although it requires an additional process for the extraction of the neutral point of the stator winding, since the position information can be obtained even when the three phases are all in the conduction state, it is possible to ideally drive the permanent magnet motor with the sine wave current.

SUMMARY OF THE INVENTION

However, in the invention described in the patent document 1, the induced voltage by the rotation of the motor has to be a detectable value, and it is equivalent to the conventional synchronous drive in open loop in the extremely low-speed range.

Also, in the inventions described in the patent documents 2 and 3, a special voltage pattern for position detection has to be inserted during the acceleration from a low speed. As a result, there arises a problem that the acceleration time becomes longer.

Further, in the invention described in the patent document 4, since the tertiary harmonic wave generated at the neutral point is a speed electromotive force caused by the rotation of the rotor, it does not result in the improvement of the properties in the low-speed range.

An object of the present invention is to provide a method for detecting a position of a permanent magnet motor without using a position sensor and a special position detecting signal even in a stopped state or an extremely low-speed state.

Further, another object of the present invention is to provide a high-response motor drive system capable of reducing the acceleration time.

The above and other objects and novel characteristics of the present invention will be apparent from the description of this specification and the accompanying drawings.

The typical ones of the inventions disclosed in this application will be briefly described as follows.

A drive system of a synchronous motor according to a typical embodiment of the present invention comprises: a three-phase synchronous motor; an inverter connected to the three-phase synchronous motor and constituted of a plurality of switching elements; and a controller for controlling the inverter, wherein the controller includes a mode switching trigger generator for outputting a mode switching trigger based on a mode command and a state of the three-phase synchronous motor, a conduction mode determining unit for switching a conduction mode based on the mode switching trigger and outputting the mode command, and a gate signal switching unit for outputting a PWM signal to the inverter.

The drive system of the synchronous motor may be characterized in that the mode switching trigger generator includes a non-conduction phase potential selector which selects a non-conduction phase of the three-phase synchronous motor and compares a potential difference between a potential of the selected non-conduction phase and a neutral point potential of the three-phase synchronous motor, a reference level switching unit which outputs a reference level to be a reference of an electromotive force of the non-conduction phase in accordance with the mode command, and a comparator which compares the reference level and an output of the non-conduction phase potential selector and outputs the mode switching trigger.

Also, the drive system of the synchronous motor further comprises a virtual neutral point generator, and it may be characterized in that the mode switching trigger generator includes a non-conduction phase potential selector which selects a non-conduction phase of the three-phase synchronous motor and compares a potential difference between a potential of the selected non-conduction phase and a neutral point potential of the virtual neutral point generator, a reference level switching unit which outputs a reference level to be a reference of an electromotive force of the non-conduction phase in accordance with the mode command, and a comparator which compares the reference level and an output of the non-conduction phase potential selector and outputs the mode switching trigger.

The drive system of the synchronous motor may be characterized in that the mode switching trigger generator includes a non-conduction phase potential selector which selects a non-conduction phase of the three-phase synchronous motor and compares a potential difference between a potential of the selected non-conduction phase and a neutral point potential of the three-phase synchronous motor, a reference level switching unit which outputs a reference level to be a reference of an electromotive force of the non-conduction phase in accordance with the mode command, a comparator which compares the reference level and an output of the non-conduction phase potential selector and outputs the mode switching trigger, and a rotation computing unit which measures the number of rotations of the three-phase synchronous motor by measuring intervals of generation of the mode switching trigger and outputs rotation information to the reference level switching unit, and the reference level switching unit changes the reference level to be output based on the rotation information.

The drive system of the synchronous motor may be characterized in that the reference level switching unit reduces the reference level as the number of rotations of the three-phase synchronous motor increases.

The drive system of the synchronous motor may be characterized in that the mode switching trigger generator includes a non-conduction phase potential selector which selects a non-conduction phase of the three-phase synchronous motor and compares a potential difference between a potential of the selected non-conduction phase and a neutral point potential of the three-phase synchronous motor, an absolute value computing unit which derives an absolute value of the output of the non-conduction phase potential selector, a reference voltage outputting unit which outputs a reference level to be a reference of an electromotive force of the non-conduction phase, and a comparator which compares an output of the absolute value computing unit and an output of the reference voltage outputting unit and outputs the mode switching trigger.

The drive system of the synchronous motor may be characterized in that the mode command outputted from the conduction mode determining unit is inputted to the gate signal switching unit, and the gate signal switching unit outputs a PWM signal based on the mode command.

The drive system of the synchronous motor further comprises a conduction mode automatic generator which periodically switches the conduction modes and a switch which selectively switches the mode commands which are outputted from the conduction mode automatic generator and the conduction mode determining unit and outputs to the gate signal switching unit, and it may be characterized in that the mode switching trigger generator includes a non-conduction phase potential selector which selects a non-conduction phase of the three-phase synchronous motor and compares a potential difference between a potential of the selected non-conduction phase and a neutral point potential of the three-phase synchronous motor, a reference level switching unit which outputs a reference level to be a reference of an electromotive force of the non-conduction phase in accordance with the mode command, a comparator which compares the reference level and an output of the non-conduction phase potential selector and outputs the mode switching trigger, a reference level setter which sets the reference level of the reference level switching unit, and a switch which determines which of the reference level setter or the comparator the output of the non-conduction phase potential selector is outputted to.

These drive systems of the synchronous motor may be characterized in that the non-conduction phase potential selector sets a sampling timing to a latter half of a conduction period.

The drive system of the synchronous motor further comprises a virtual neutral point generator, and it may be characterized in that the mode switching trigger generator includes a neutral point potential amplifier which amplifies a potential difference between a neutral point potential of the three-phase synchronous motor and a neutral point potential of the virtual neutral point generator, a reference level switching unit which outputs a reference level to be a reference of an electromotive force of the non-conduction phase in accordance with the mode command, and a comparator which compares the reference level and an output of the neutral point potential amplifier and outputs the mode switching trigger.

The effects obtained by typical one of the inventions disclosed in this application will be briefly described below.

The drive system of the synchronous motor according to a typical embodiment of the present invention can achieve the extremely low-speed drive from a stopped state with almost the same configuration as the control configuration of a conventional 120 degree conduction sensorless system.

Also, the drive system of the synchronous motor according to a typical embodiment of the present invention does not insert a special position detecting voltage and can obtain the smooth acceleration.

Further, the drive system of the synchronous motor according to a typical embodiment of the present invention itself is a simple system and is quite effective for the case of forming a dedicated IC.

BRIEF DESCRIPTIONS OF THE DRAWINGS

DESCRIPTIONS OF THE PREFERRED EMBODIMENTS

Hereinafter, embodiments of the present invention will be described in detail with reference to the accompanying drawings.

First Embodiment

Figure 1:
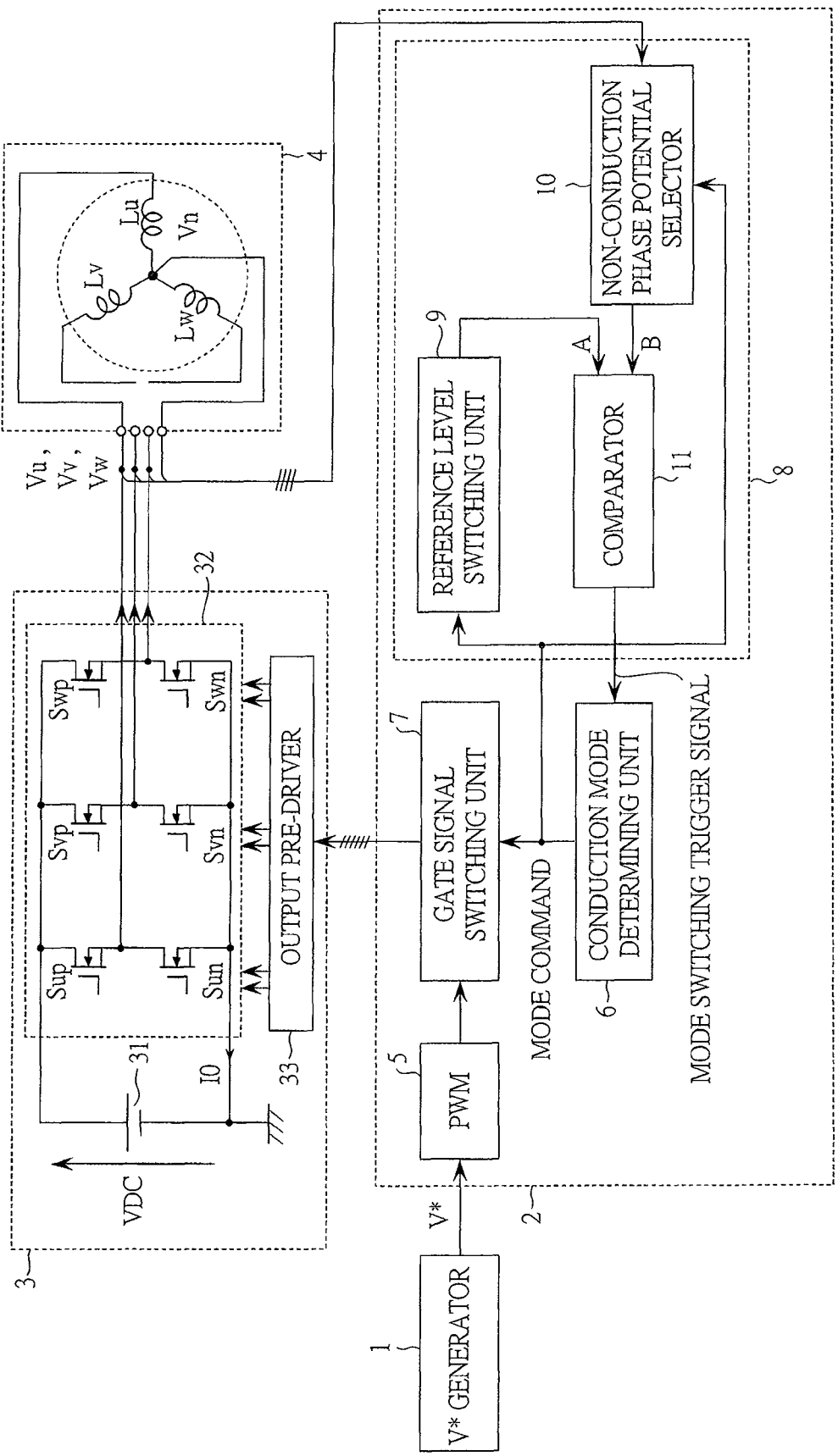
FIG. 1 is a block diagram showing the configuration of a motor drive system according to the first embodiment.

FIG. 1 is a block diagram showing a configuration of a drive system of a synchronous motor (hereinafter, referred to as a motor drive system) according to the first embodiment of the present invention.

This motor drive system is intended to drive a permanent magnet motor 4. Roughly classified, the motor drive system is configured to include a V* generator 1, a controller 2, an inverter 3 and the permanent magnet motor 4 to be driven.

The V* generator is a circuit for generating V* which is an application voltage command of the permanent magnet motor 4. The V* generator 1 is a controller located at an upper level of the controller 2. For example, when the current of the permanent magnet motor 4 is to be controlled, an output of the V* generator 1 can be considered as an output of a current controller. The voltage corresponding to the application voltage command V* is subjected to pulse width modulation (PWM) and then applied to the permanent magnet motor 4.

The controller 2 is a circuit which computes the applied voltage to the permanent magnet motor 4 and generates a pulse width modulation (PWM) wave signal to the inverter 3. The controller 2 is configured to include a PWM generator 5, a conduction mode determining unit 6, a gate signal switching unit 7 and a mode switching trigger generator 8.

The PWM generator 5 is a circuit which generates a PWM wave by performing the pulse width modulation based on the output of the V* generator 1.

The conduction mode determining unit 6 sequentially outputs a mode command signal determining a switching mode of the inverter 3. The conduction mode determining unit 6 switches the conduction mode with using the mode switching trigger signal generated by the mode switching trigger generator 8 as a trigger.

The gate signal switching unit 7 determines how respective switching elements Sup, Sun, Svp, Svn, Swp and Swn of an inverter main circuit unit 32 (described later) are switched based on the mode command signal outputted from the conduction mode determining unit 6. According to this determination, eventual six gate pulse signals are outputted to the inverter 3.

The mode switching trigger generator 8 is a circuit which notifies the gate signal switching unit 7 of the mode change and instructs the switching of the gate pulse signal with the mode switching trigger signal. The mode switching trigger generator 8 includes a reference level switching unit 9, a non-conduction phase potential selector 10 and a comparator 11.

The reference level switching unit 9 is a circuit which generates a reference level to be a reference of an electromotive force of a non-conduction phase of the permanent magnet motor 4. A mode command signal outputted from the conduction mode determining unit 6 is used as the switching timing thereof.

The non-conduction phase potential selector 10 is a circuit which selects the non-conduction phase from the three-phase terminal voltages of the permanent magnet motor 4 in accordance with the mode command signal and outputs the potential difference with respect to a neutral point potential Vn of the permanent magnet motor 4.

The comparator 11 is a comparator which compares an output of the reference level switching unit 9 and an output of the non-conduction phase potential selector 10 and outputs the mode switching trigger to the conduction mode determining unit 6.

The inverter 3 is a circuit which generates AC voltage from a DC power supply. The inverter 3 is configured to include a DC current supply 31 which supplies power to the inverter, an inverter main circuit unit 32 constituted of the six switching elements Sup, Sun, Svp, Svn, Swp and Swn and an output pre-driver 33 which directly drives the inverter main circuit unit 32.

The inverter main circuit unit 32 switches the respective switching elements in accordance with an output of the output pre-driver 33 so as to perform the operations of the determined switching mode.

The output pre-driver 33 outputs switching signals of the respective switching elements to the inverter main circuit unit 32 in accordance with the output of the gate signal switching unit 7 determined by the output of the conduction mode determining unit 6.

Next, a basic operation according to the present embodiment will be described.

Figure 2:
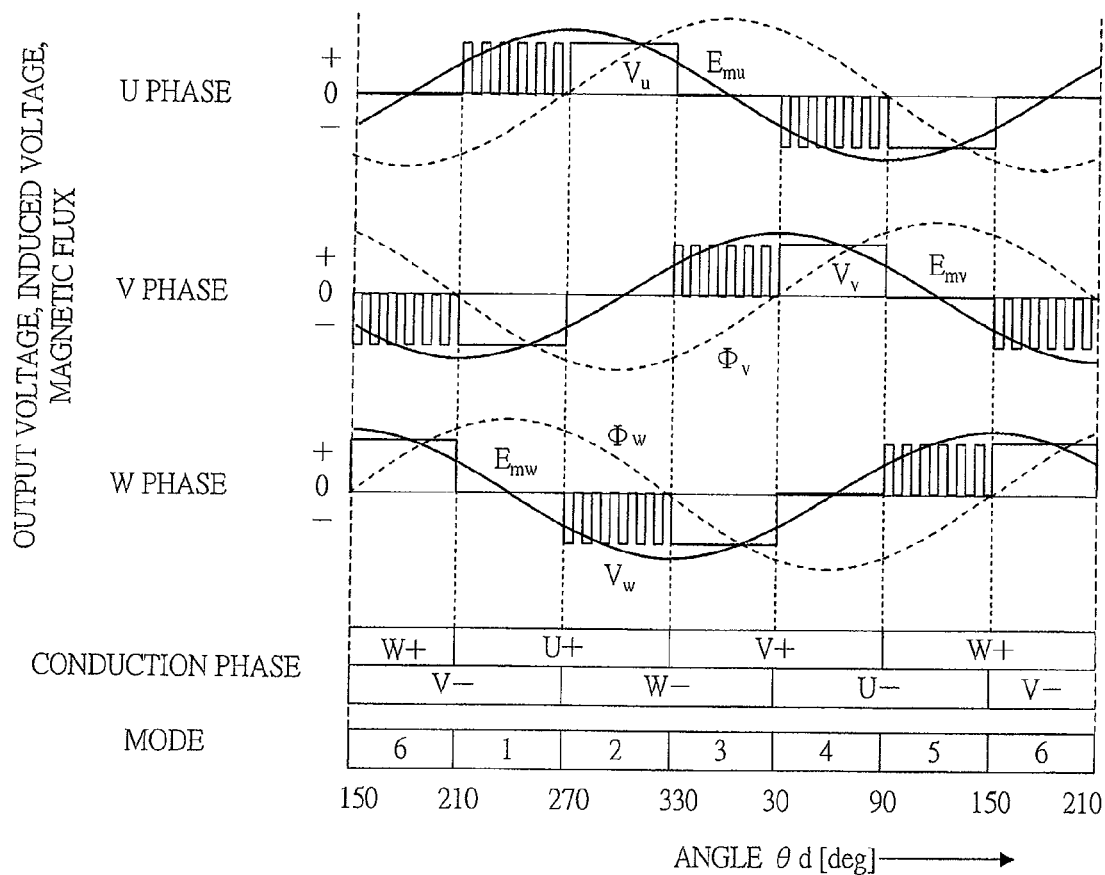
FIG. 2 is a diagram showing a definition of conduction modes of a permanent magnet motor to be controlled and an example of voltage waveforms of each phase according to the first embodiment.

FIG. 2 is a diagram showing a definition of conduction modes of the permanent magnet motor 4 to be controlled and an example of voltage waveforms of each phase according to the present embodiment. In this figure, conduction modes 1 to 6 switched at each 60 degrees of electric angle ("MODE" of vertical axis in FIG. 2) and inverter outputs of each phase at this time are shown. For example, in the mode 3, the U phase is a non-conduction phase, and the switching elements Sup and Sun of the inverter main circuit unit 32 of FIG. 1 are both in an off state. Also, the switching element Svp performs the PWM (pulse width modulation) with respect to the V phase, and the switching element Swn is kept in an on state with respect to the W phase.

The motor gains the rotational force and is driven by sequentially switching the modes at each 60 degrees of electric angle as described above. At this time, it is important to select the appropriate conduction mode in accordance with the rotation position and control the switching timing to the next mode so that torque is generated to the rotator to which a permanent magnet is attached.

In the usual position sensorless system by the 120 degree conduction, the switching of the conduction mode is performed with using a signal of an induced voltage (speed electromotive force) generated in the non-conduction phase as a trigger. For example, in the mode 3 and the mode 6 in FIG. 2, the U phase is the non-conduction phase. It can be understood that, at this time, Emu which is the induced voltage of a motor crosses the "0" volt at the midpoint of each mode. Therefore, it is possible to make transition to the next mode based on the "0" cross signal.

However, in the region where the rotation speed is extremely low, the induced voltage (speed electromotive force) is buried in the noise and is hard to be detected. Therefore, the estimation of the rotator position information by means of different method is necessary.

The above-mentioned patent documents 2 and 3 disclose the position detection by means of the transformer electromotive force. The principle thereof is shown in FIG. 3 and FIG. 4.

Figure 3A:
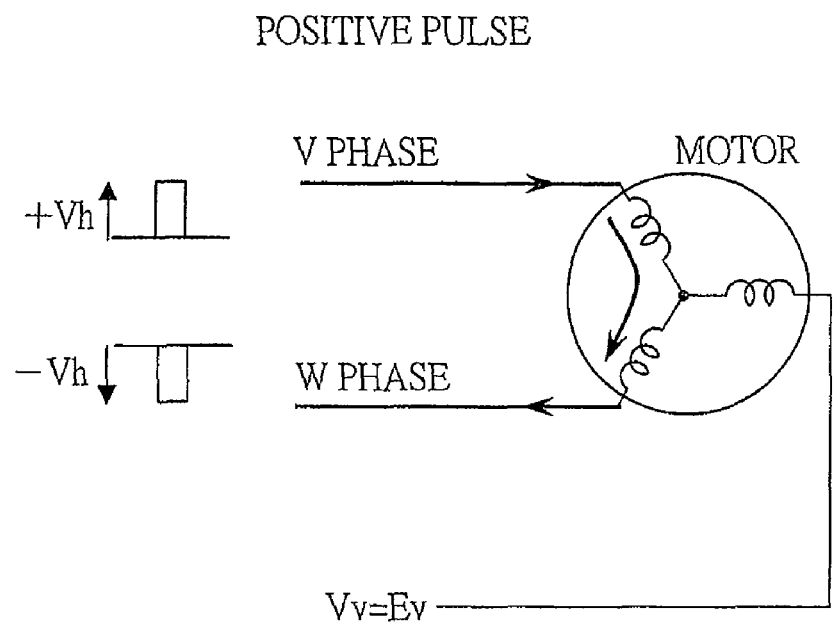
FIG. 3A is a schematic diagram showing the state where the pulse corresponding to the mode 3 is applied according to the first embodiment.
Figure 3B:
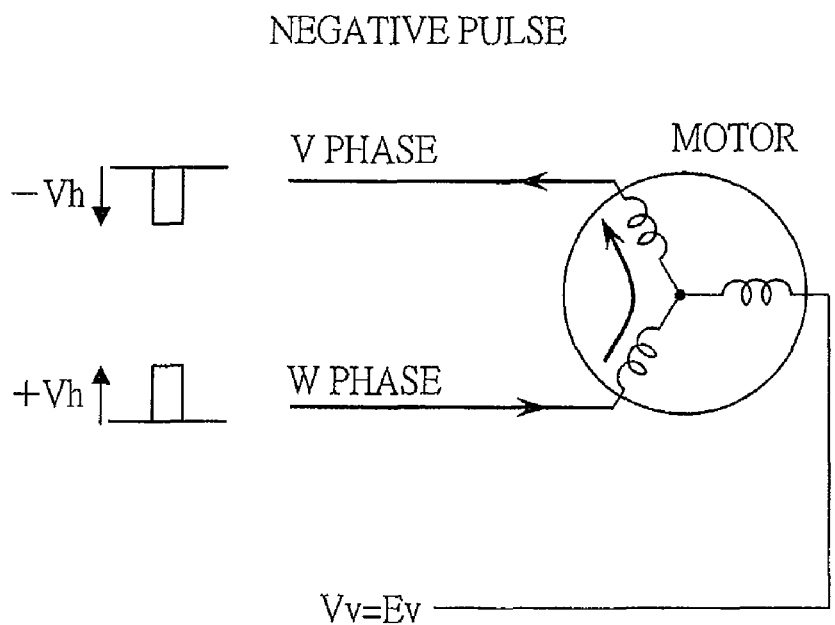
FIG. 3B is a schematic diagram showing the state where the pulse corresponding to the mode 6 is applied according to the first embodiment.

FIG. 3A is a schematic diagram showing the state where the pulse corresponding to the mode 3 of FIG. 2 is applied, and FIG. 3B is a schematic diagram showing the state where the pulse corresponding to the mode 6 of FIG. 2 is applied. FIG. 4 is a schematic diagram showing the relationship between the pulse induced voltage and the mode (angle) according to the present embodiment. Also, FIG. 5 is a schematic diagram showing the induced voltage generated in the mode 3 and the mode 6 in the normal PWM.

Figure 4:
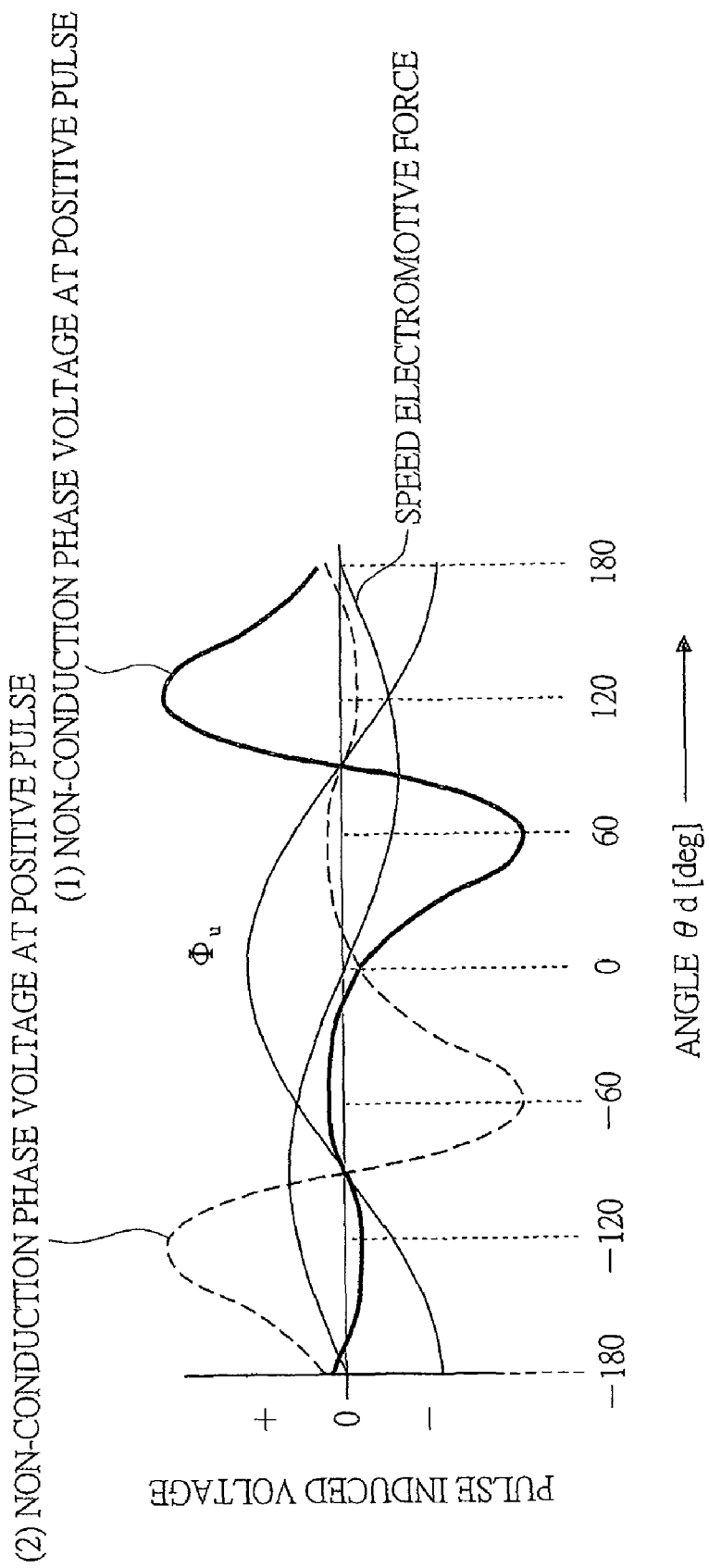
FIG. 4 is a schematic diagram showing the relationship between the pulse induced voltage and the mode (angle) according to the first embodiment.
Figure 5:
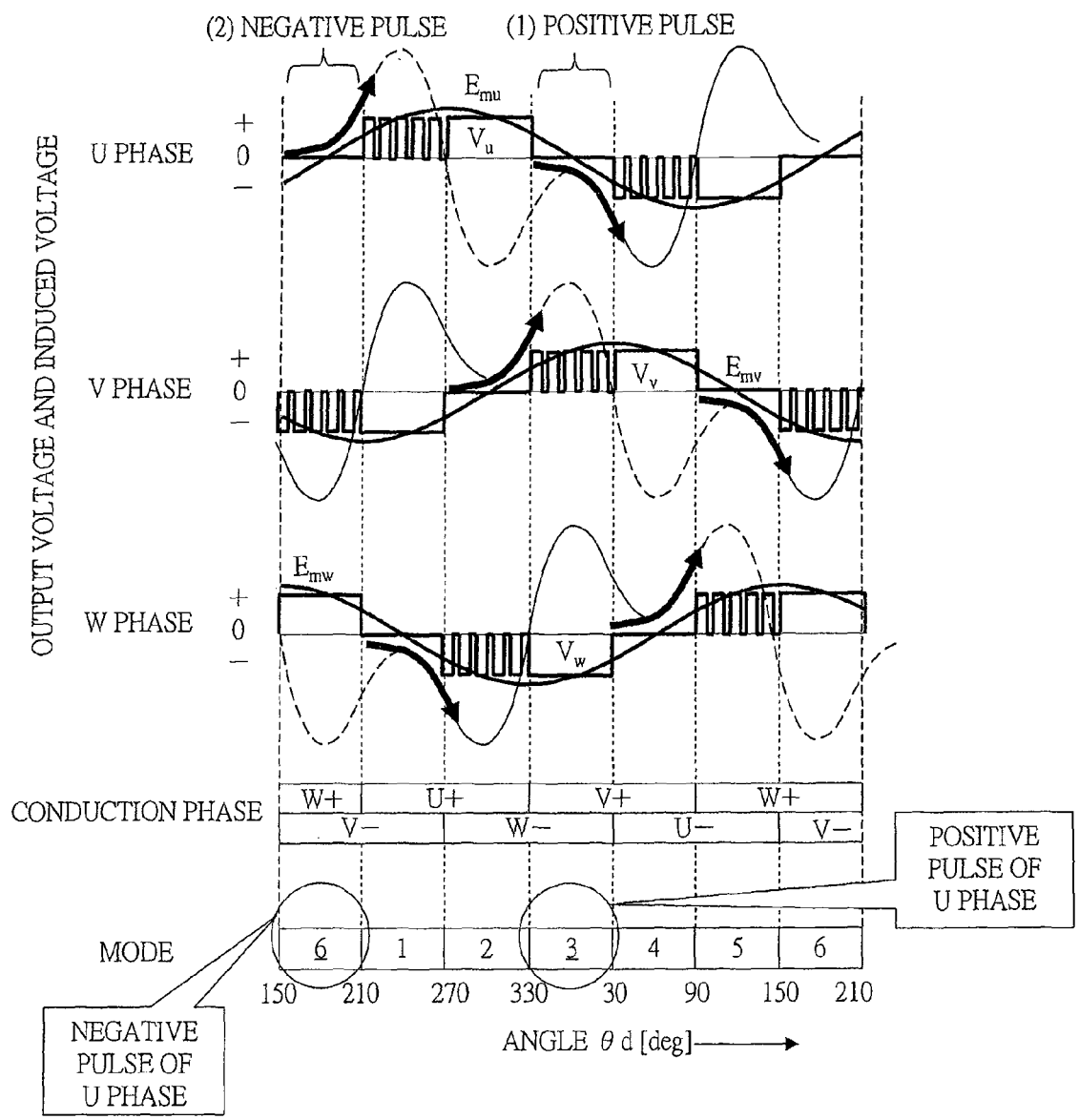
FIG. 5 is a schematic diagram showing the induced voltage generated in the mode 3 and the mode 6 in the normal PWM according to the first embodiment.

When the positional angle of the rotator is changed by one cycle of the electric angle with respect to the mode 3 and the mode 6, the induced voltage appearing in the non-conduction phase is as shown in FIG. 4. By this rotator position, the change of the induced voltage in the U phase can be understood.

This induced voltage is not the speed electromotive force, but is the one corresponding to the difference in change rate of magnetic flux generated in the V phase and the W phase observed in the U phase. Therefore, even in the stopped state and the low-speed state, the electromotive force in accordance with the rotator position can be observed. In the patent document 2 and the patent document 3, 6 conduction modes are sequentially applied to the motor and non-conduction potentials at that time are observed to obtain the rotator position information.

This method is advantageous when measuring an initial position in a stopped state, but if this method is implemented during acceleration, the acceleration torque is decreased and the rotation speed is lowered.

In the present invention, this problem is solved by introducing the mode switching trigger generator 8 shown in FIG. 1.

The applied pulses shown in FIG. 3A and FIG. 3B are described as particular pulses for position estimation in the patent documents 2 and 3. However, attention is paid to the fact that this operation is present also in the usual 120 degree conduction system. This is equivalent to the state of FIG. 3A. Similarly, the mode 6 is also equivalent to the pulse application of FIG. 3B.

The induced voltage of the U phase at this time is like that shown by a broad arrow mark of FIG. 5. More specifically, the electromotive force decreased in a minus direction is observed in the mode 3, and the electromotive force increased in a plus direction is observed in the mode 6. When these observed voltages are directly used as the triggers for the mode switching, the triggers for mode switching can be generated without applying special signals.

Figure 6:
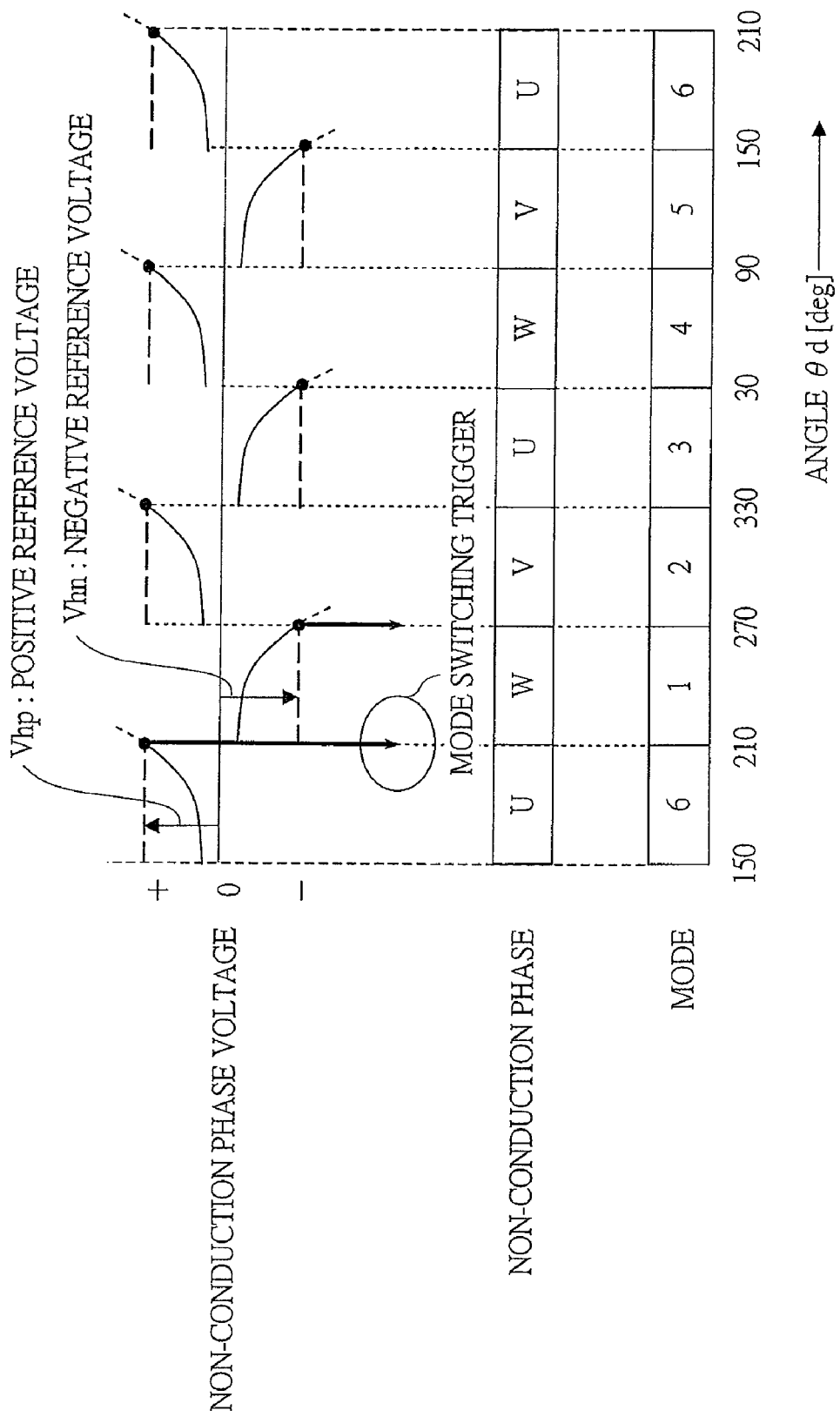
FIG. 6 is a diagram showing the relationship of the conduction mode, the non-conduction phase and the induced voltage according to the first embodiment.

FIG. 6 is a diagram showing the relationship of the conduction mode, the non-conduction phase and the induced voltage according to the present embodiment. It can be understood that the induced voltage is repeatedly increased and decreased in positive and negative directions each time when the conduction mode is switched. Therefore, the reference voltage Vhp on a positive side and the reference voltage Vhn on a negative side are respectively set in advance, and the mode switching trigger is generated based on the relation in magnitude between the reference voltages and the induced voltage. Note that the absolute values of Vhn and Vhp are equal to each other in principle.

Figure 7:
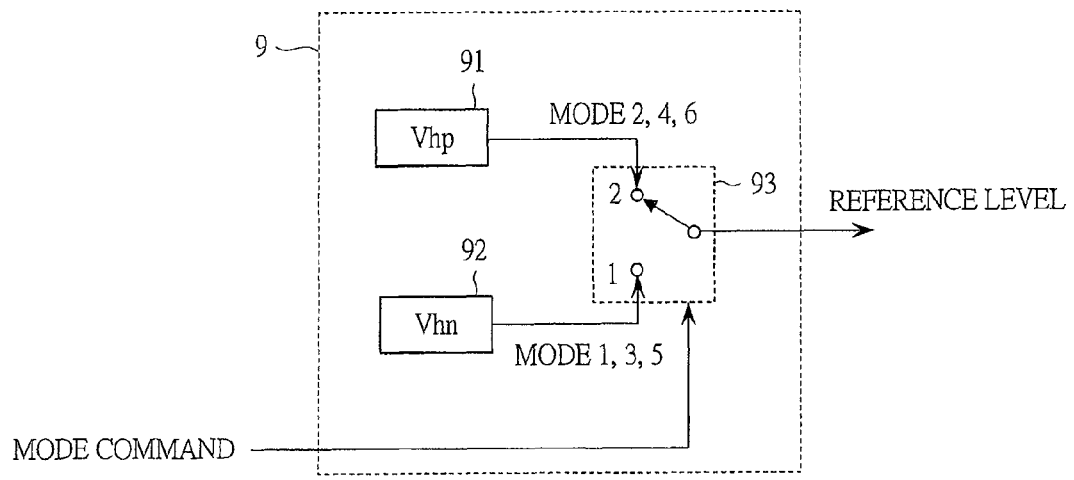
FIG. 7 is a block diagram showing a configuration of the reference level switching unit according to the first embodiment.

FIG. 7 is a block diagram showing a configuration of the reference level switching unit 9. The reference level switching unit 9 is configured to include a positive reference voltage setter 91, a negative reference voltage setter 92 and a switch 93. When the mode command generated from the mode switching trigger generator 8 indicates the modes 1, 3 and 5, the switch 93 is turned to a "1" side to set the reference level to Vhn. On the other hand, when the mode command indicates the modes 2, 4 and 6, the switch 93 is turned to a "2" side to set the reference level to Vhp.

In the comparator 11, the reference level outputted from the reference level switching unit 9 and the induced voltage of the non-conduction phase are compared to generate the mode switching trigger. By this means, appropriate motor driving torque is obtained in accordance with the position of the rotator. As described above, the induced voltage of the non-conduction phase is a transformer electromotive force, and therefore, the high sensitive detection can be achieved even in the extremely low-speed state.

Figure 8:
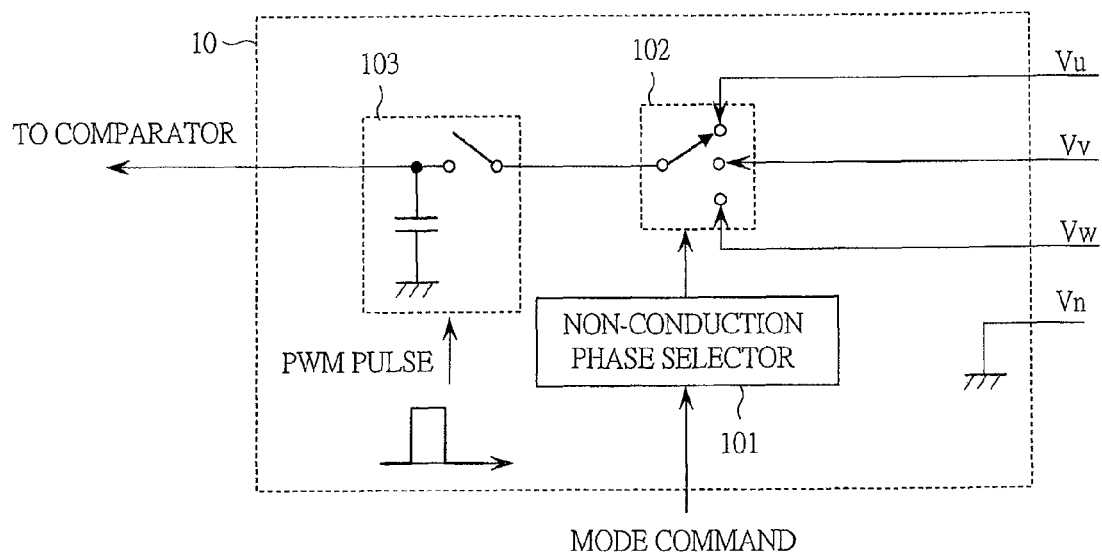
FIG. 8 is a circuit diagram showing the configuration of the non-conduction phase potential selector according to the first embodiment.

FIG. 8 is a circuit diagram showing the configuration of the non-conduction phase potential selector 10.

In the non-conduction phase potential selector 10, upon reception of the mode command outputted from the conduction mode determining unit 6, one non-conduction phase is selected from the voltage applied to the permanent magnet motor 4 by the non-conduction phase selector 101. In a switch 102, the voltage of non-conduction phase is selected and a signal is transmitted to a sample hold circuit 103. The sample hold circuit 103 has a general configuration constituted of a switch of a sampler and a capacitor for maintaining the sampled potential. The potential of the non-conduction phase is sample-held in the sample hold circuit 103 in synchronization with the application of the PWM pulse. This signal is transmitted to the comparator 11. In this configuration, the necessary potential of the non-conduction phase is obtained.

In the configuration described above, one object of the present invention can be achieved, in other words, the position detection at the low speed can be performed without using a sensor.

Second Embodiment

Next, the second embodiment of the present invention will be described with reference to FIG. 9 and FIG. 10.

Figure 9:
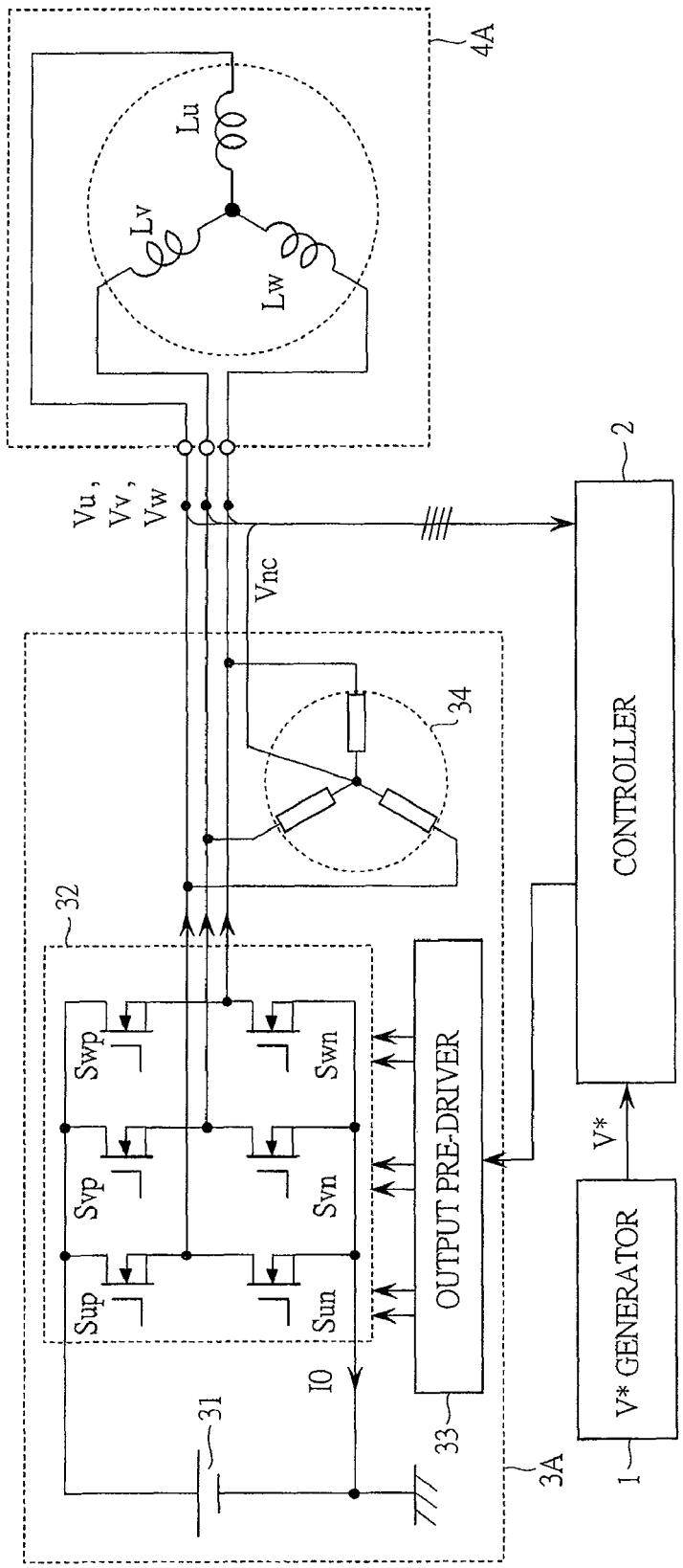
FIG. 9 is a block diagram showing the configuration of a motor drive system according to the second embodiment.

FIG. 9 is a block diagram showing the configuration of a motor drive system according to the present embodiment. The difference between the first embodiment and the present embodiment is that the permanent magnet motor 4 and the inverter 3 are replaced with a permanent magnet motor 4A and an inverter 3A.

The permanent magnet motor 4A is a motor which does not have a terminal of the neutral point potential Vn. Depending on the types of motor, the neutral point potential is hard to extract (for example, the one in which the winding is Δ connection) and the number of terminals has to be reduced as much as possible in consideration of cost like the motor incorporated in a compressor of an air conditioner. The present invention assumes the use in such cases.

In the inverter 3A, a virtual neutral point generator 34 is connected to an inverter output portion. The virtual neutral point generator 34 is constituted of Y-connected resistors. A connecting point of these resistors is set as a virtual neutral point potential Vnc and is used instead of Vn of the first embodiment.

Figure 10:
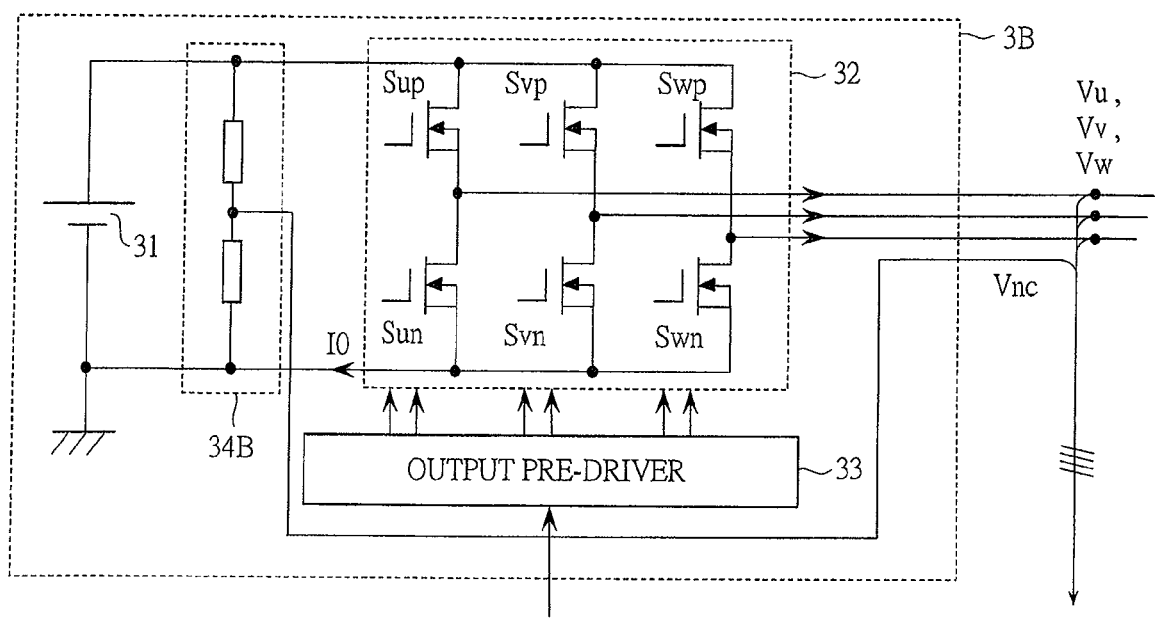
FIG. 10 is a diagram showing another forming method of the neutral point potential according to the second embodiment.

FIG. 10 is a diagram showing another forming method of the neutral point potential according to the present embodiment. In this embodiment, a virtual neutral point generator 34B is connected to a DC power supply portion to obtain the neutral point potential Vnc. In this virtual neutral point generator 34B, the DC power supply 31 is divided by resistors.

Also in the configuration of this embodiment, the induced voltage generated in the non-conduction phase can be observed, and therefore, the senseless driving from the low-speed range can be performed.

Third Embodiment

Next, the third embodiment of the present invention will be described.

Figure 11:
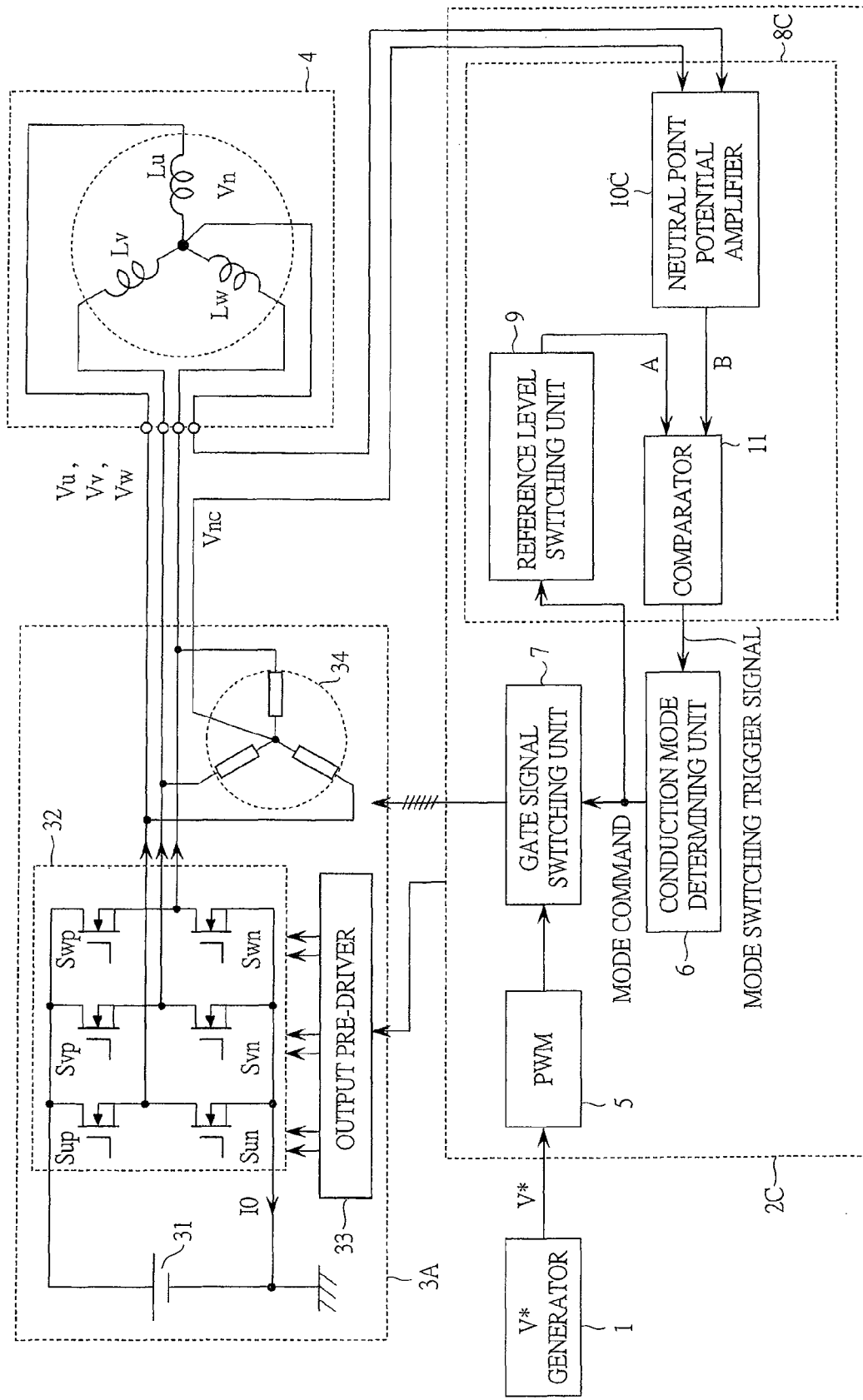
FIG. 11 is a block diagram showing the motor drive system according to the third embodiment.

FIG. 11 is a block diagram showing the motor drive system according to the third embodiment. The present embodiment differs in that the controller 2 is replaced with a controller 2C.

The controller 2C of the present embodiment does not detect the terminal voltage of the permanent magnet motor 4, but it reads the neutral point potential Vn of the permanent magnet motor 4 and the virtual neutral point potential Vnc connected to the output of the inverter instead.

The difference between the controller 2 of the first embodiment and the controller 2C of the present embodiment is in a mode switching trigger generator 8C. The mode switching trigger generator 8C of the present embodiment amplifies the potential difference between the neutral point potential Vn of the permanent magnet motor 4 and the virtual neutral point potential Vnc by a neutral point potential amplifier 10C. The output of the neutral point potential amplifier 10C and the output of the reference level switching unit 9 are compared by the comparator 11, thereby generating the mode switching trigger.

The configuration described above is formed based on the following principle. That is, previously, the difference of the transformer electromotive force is detected from the potential of the non-conduction phase in principle. However, in the state where the transformer electromotive force varies, that is, in the state where the position of a rotator changes, the self inductance of the coil in conduction also changes depending on the position of the rotator. Due to the change of the self inductance, the neutral point potential Vn also changes. More specifically, when the neutral point potential is observed, the position information of the rotator can be detected.

With the configuration as described above, it becomes unnecessary to extract the potential of the non-conduction phase to the controller 2C. Also, in this configuration, the selection of the non-conduction phase and the non-conduction phase potential selector 10 used therefor are unnecessary.

Further, in the case of the high-voltage motor, level shift of the terminal voltage in accordance with the controller input is required in the first embodiment. However, the present embodiment has an advantage that the circuit configuration can be significantly simplified. Accordingly, the position sensorless driving from the low speed can be achieved in the more simplified configuration.

Fourth Embodiment

Next, the fourth embodiment of the present invention will be described with reference to FIG. 12.

Figure 12:
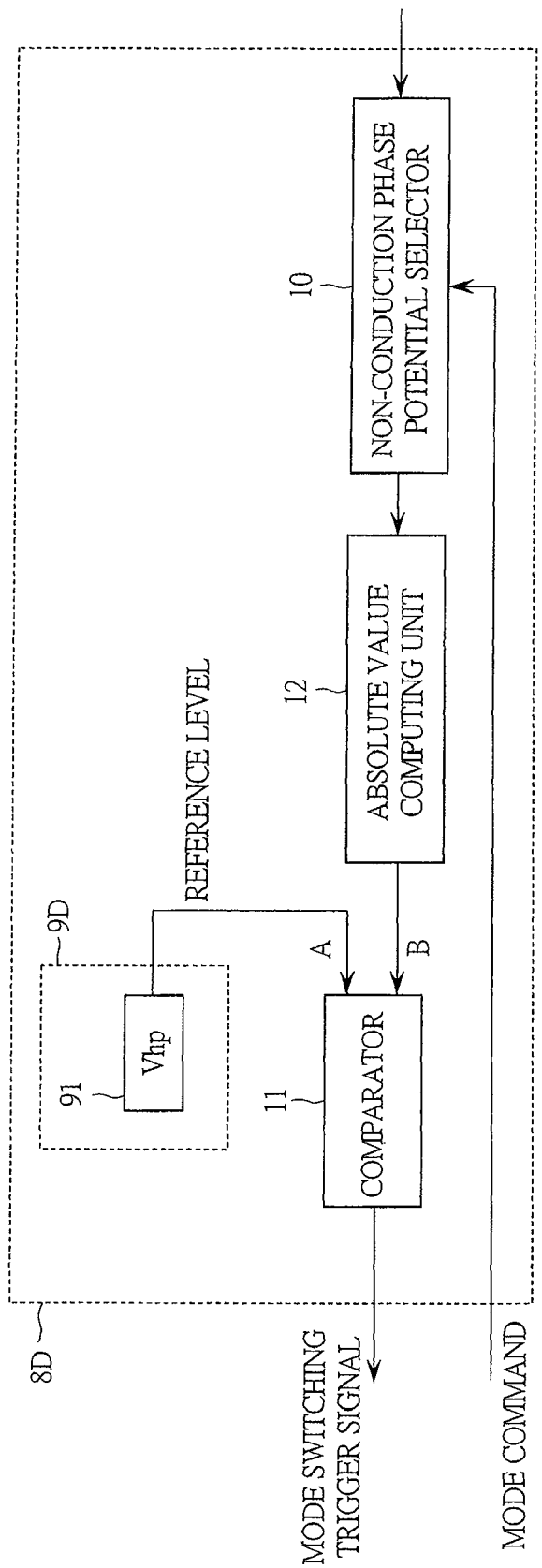
FIG. 12 is a block diagram of a mode switching trigger generator according to the fourth embodiment.

FIG. 12 is a block diagram of a mode switching trigger generator 8D according to the present embodiment. The present embodiment is exemplified by applying the mode switching trigger generator 8D to the circuit configuration of the first embodiment and the circuit configuration of the second embodiment.

This mode switching trigger generator 8D includes a reference level switching unit 9D, the non-conduction phase potential selector 10, the comparator 11 and an absolute value computing unit 12. Of these, the reference level switching unit 9D and the absolute value computing unit 12 unique to the present embodiment will be described.

In the first to third embodiments, positive and negative are switched in accordance with the conduction mode. The reference level switching unit 9 of the first embodiment has two reference voltage setters. Contrary to this, the reference level switching unit 9D of the present embodiment has only one reference voltage setter.

On the other hand, the three-phase terminal voltage of the permanent magnet motor 4 to be inputted has positive and negative. Thus, the absolute value thereof is obtained by providing the absolute value computing unit 12.

By this means, the controllable low-speed sensorless driving with simple configuration can be achieved.

Fifth Embodiment

Next, the fifth embodiment of the present invention will be described.

FIG. 13 is a conceptual diagram showing the sampling timing of the induced voltage.

According to the principle of the present invention, the voltage induced in the non-conduction phase is detected by the PWM waveform. Since the transient phenomenon occurs at the time of the pulse application, the actual induced voltage forms a gentle curve as shown in FIG. 13.

Figure 13A:
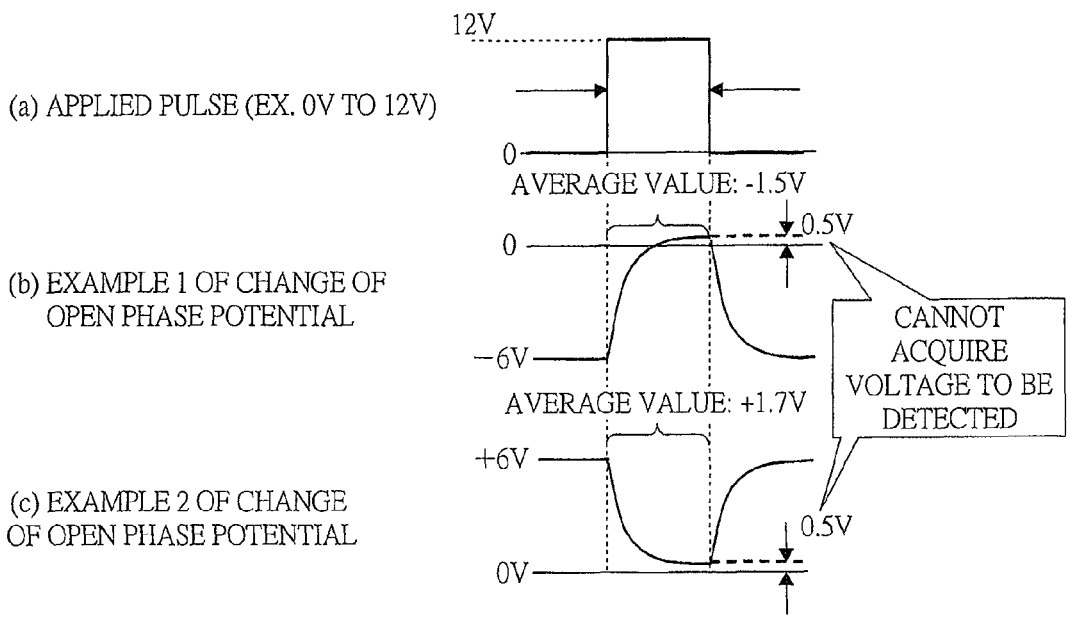
FIG. 13A is a conceptual diagram showing the sampling timing of the induced voltage according to the fifth embodiment.
Figure 13B:
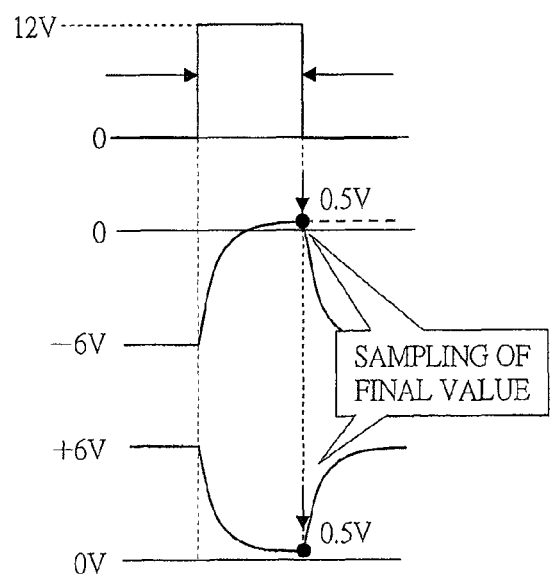
FIG. 13B is a conceptual diagram showing the sampling timing of the induced voltage according to the fifth embodiment.

At this time, two sampling methods are possible such as the one shown in FIG. 13B in which an approximate final value in the pulse output period is sample-held and the other shown in FIG. 13A in which an average value in the pulse output period is sample-held. Although it seems that more accurate value can be obtained when the average value in the pulse period is obtained, there is the possibility that the result far from the really-required voltage is obtained as shown in FIG. 13A.

Also, when the applied pulse is short (in the case where the carrier frequency is high or the like), the really-required potential cannot be obtained and the malfunction occurs in some cases.

Therefore, in order to prevent the transient phenomenon, the sample hold circuit 103 samples the potential of the non-conduction phase at the latter half of the applied pulse (after the midpoint of the pulse) as far as possible. For example, when the sampling of the non-conduction phase is carried out by using the falling edge of the PWM pulse, the potential close to the final result can be obtained, and more accurate sensorless driving can be achieved.

Sixth Embodiment

Next, the sixth embodiment of the present invention will be described.

Figure 14:
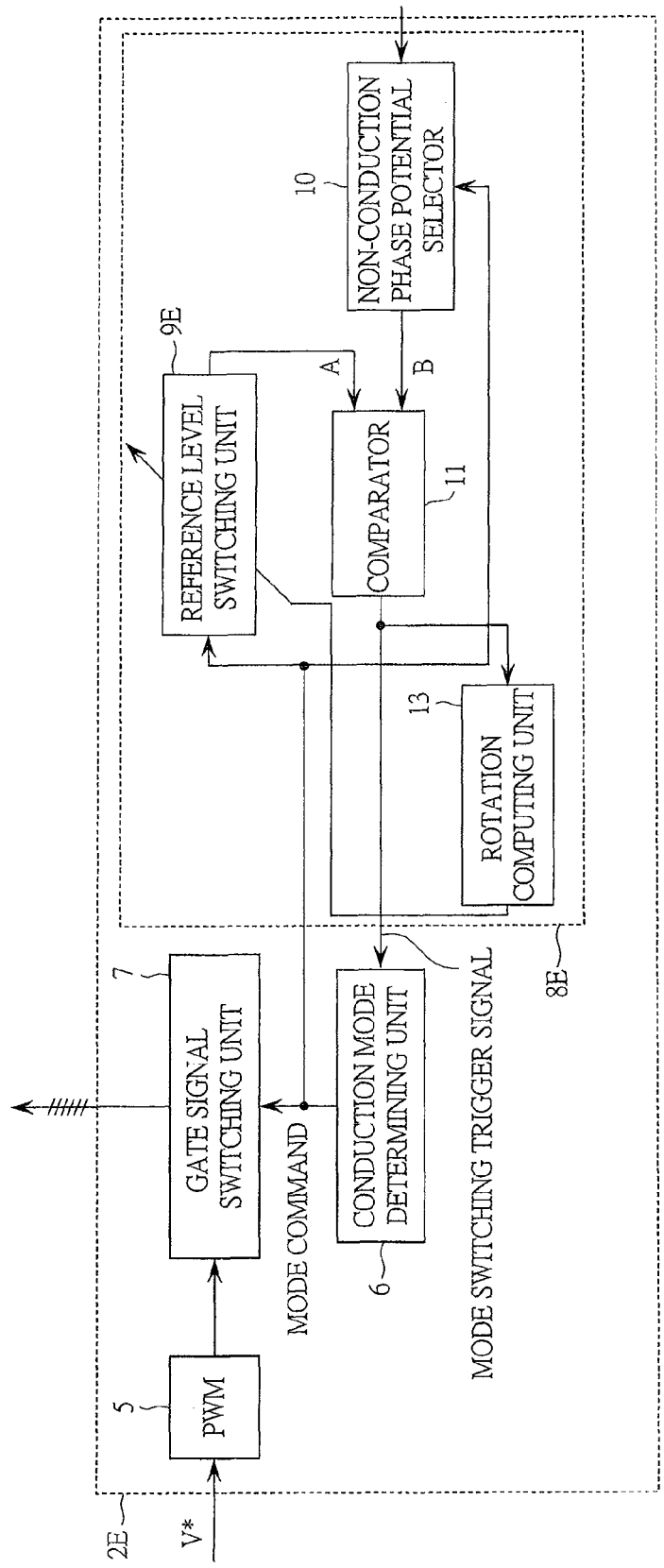
FIG. 14 is a block diagram showing another controller according to the sixth embodiment.

FIG. 14 is a block diagram showing another controller 2E according to the present embodiment.

The difference between the controller 2 of the first embodiment and the controller 2E of the present embodiment is in a mode switching trigger generator 8E.

The mode switching trigger generator 8E is characterized in that a reference level switching unit 9E and a rotation computing unit 13 are added thereto.

The reference level switching unit 9E is similar to the reference level switching unit 9 of the first embodiment in that it switches Vhp and Vhn in accordance with the mode. However, the reference level switching unit 9E differs from the reference level switching unit 9 in that it can increase and decrease Vhp and Vhn based on the speed information given from the rotation computing unit 13.

The rotation computing unit 13 is a circuit which measures the intervals of generation of the mode switching trigger and computes the number of rotations of the permanent magnet motor 4.

The basic operation according to the present embodiment will be described below.

The induced voltage detected in the present invention is the transformer electromotive force. In addition to this, the speed electromotive force generated with the rotation of the rotor is generated as the number of rotations increases.

As shown in FIG. 5, the speed electromotive force in the non-conduction period (for example, Emu of U phase) tends to increase in the same direction as the transformer electromotive force. Therefore, when the conduction mode switching according to the present invention is performed, the speed electromotive force is added along with the acceleration, and the reference level is reached early. As a result, the switching timing of the conduction mode is hastened, and there arise the problems of the reduction of generated torque and the longer acceleration time.

These problems can be solved by making the reference level variable in accordance with the rotation speed of the permanent magnet motor 4. More specifically, the absolute value of the reference level is increased as the number of rotations increases. The controller 2E in FIG. 14 can embody the process.

The rotation computing unit 13 measures the intervals of generation of the mode switching trigger and computes the number of rotations of the permanent magnet motor 4. In accordance with the number of rotations, the reference levels Vhp and Vhn are changed by the reference level switching unit 9E, thereby switching the conduction mode to the appropriate one.

According to the present embodiment, the smooth acceleration can be obtained without being affected by the induced voltage.

Seventh Embodiment

Next, the seventh embodiment of the present invention will be described.

Figure 15:
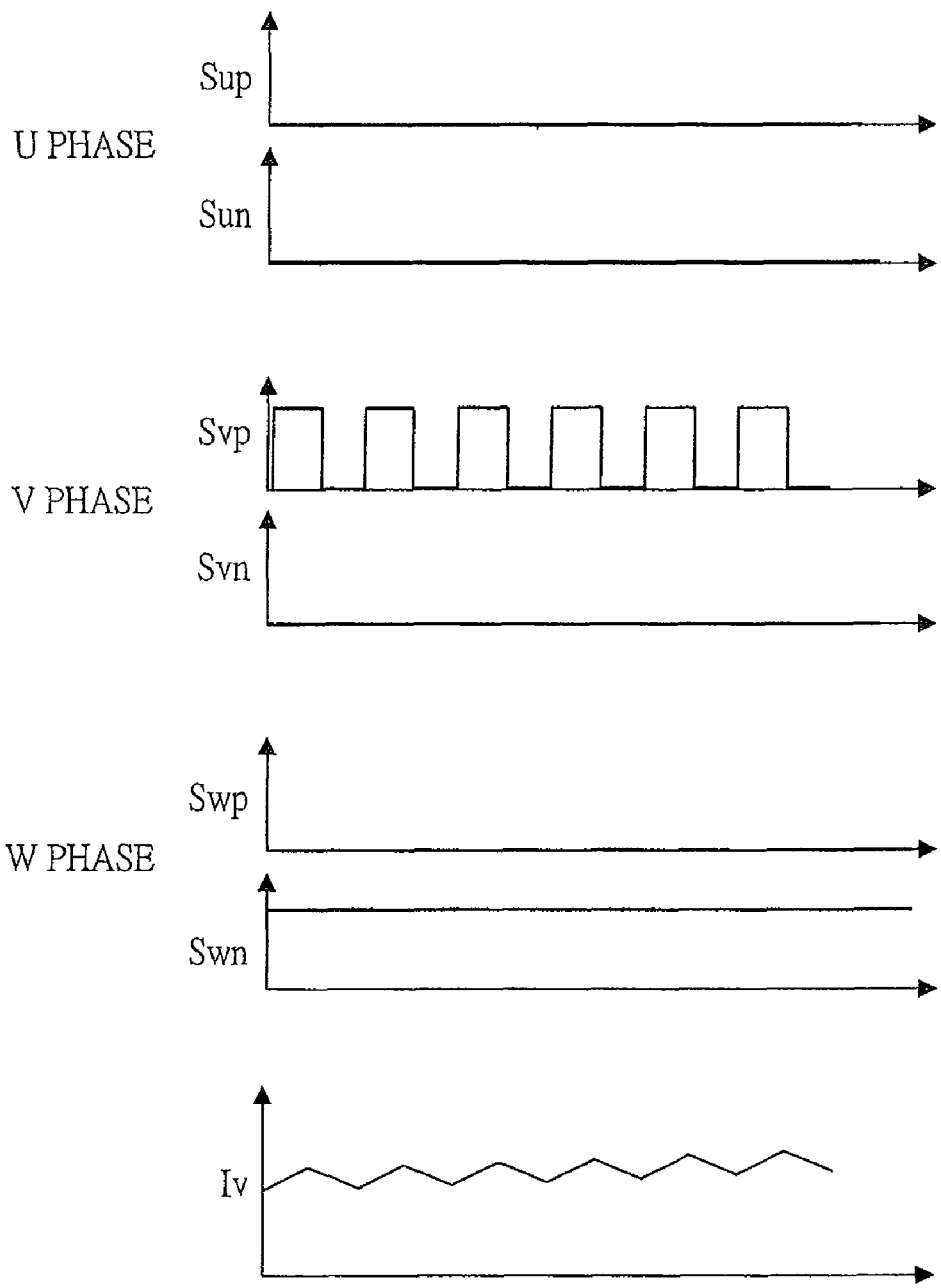
FIG. 15 is a diagram showing the operation of the gate signal of the inverter-switching element in the inverter main circuit unit in the mode 3 according to the seventh embodiment.

FIG. 15 is a diagram showing the operation of the gate signal of the inverter-switching element in the inverter main circuit unit 32 in the mode 3. Also, FIG. 16 shows an example in which the switching operation of the conduction phase (V phase and W phase in the mode 3) is realized by the complementary switching according to the present embodiment.

By performing the complementary operation as described above, the current ripple is increased and the harmonic wave loss is increased in general.

However, the present invention intends to generate the transformer electromotive force by the transient phenomenon caused by the switching. Therefore, the detection sensitivity tends to increase as the current ripple increases.

Figure 16:
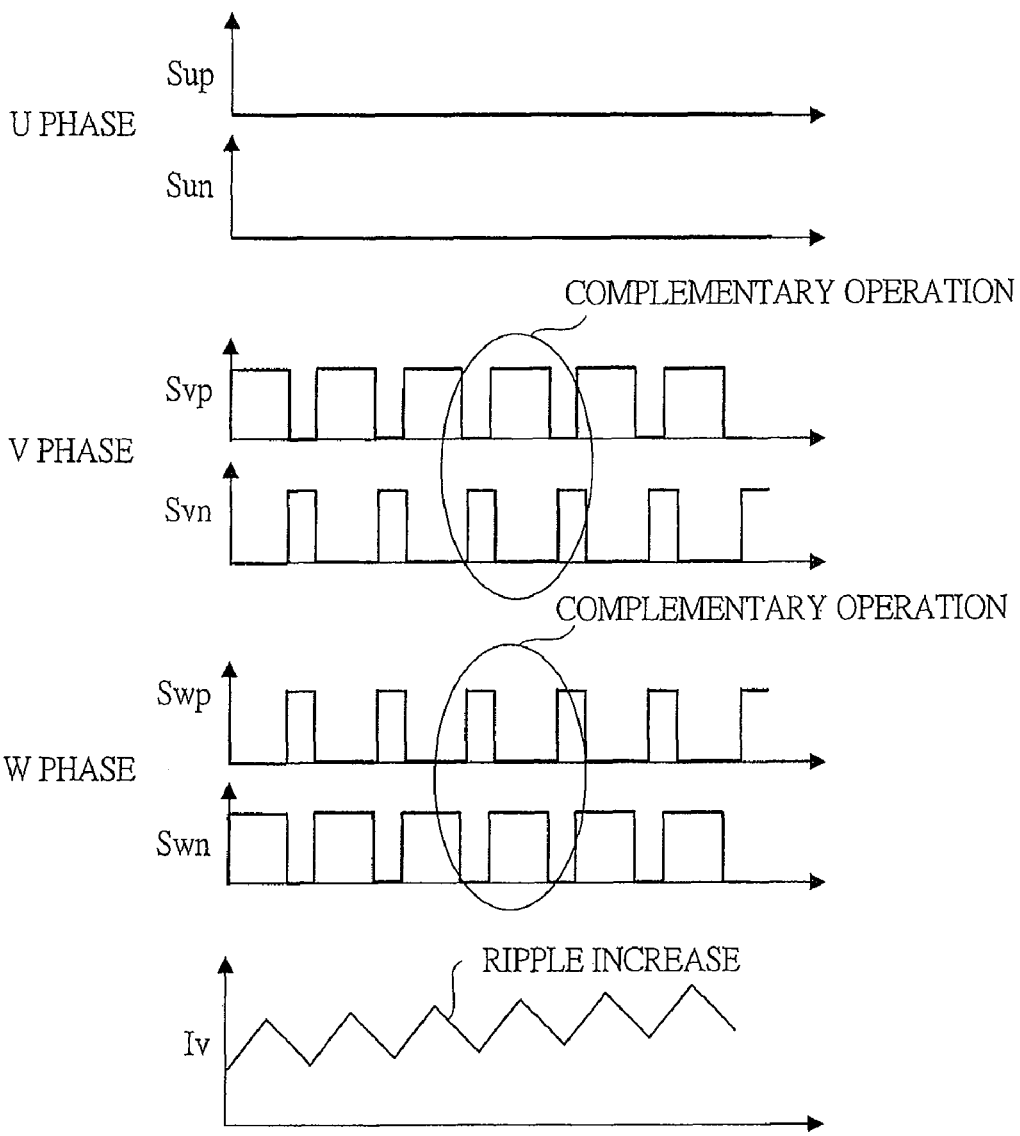
FIG. 16 is a diagram showing an example in which the switching operation of the conduction phase is realized by the complementary switching according to the seventh embodiment.

Thus, in the present embodiment, the complementary operation as shown in FIG. 16 is performed for the signal outputted to the inverter main circuit unit 32 from the output pre-driver 33. By this means, compared with the case where the complementary operation is not performed, the switching of the conduction mode can be made more reliably.

Eighth Embodiment

Next, the eighth embodiment of the present invention will be described.

The transformer electromotive force used for the conduction mode switching strongly depends on the magnetic characteristics of the motor. Therefore, it is extremely difficult to make settings in advance. Particularly, when an unknown motor whose analysis result is difficult to obtain is used, it is necessary to make the settings of the reference level in accordance with the rear thing. The present embodiment intends to automatically perform the work as mentioned above.

Figure 17:
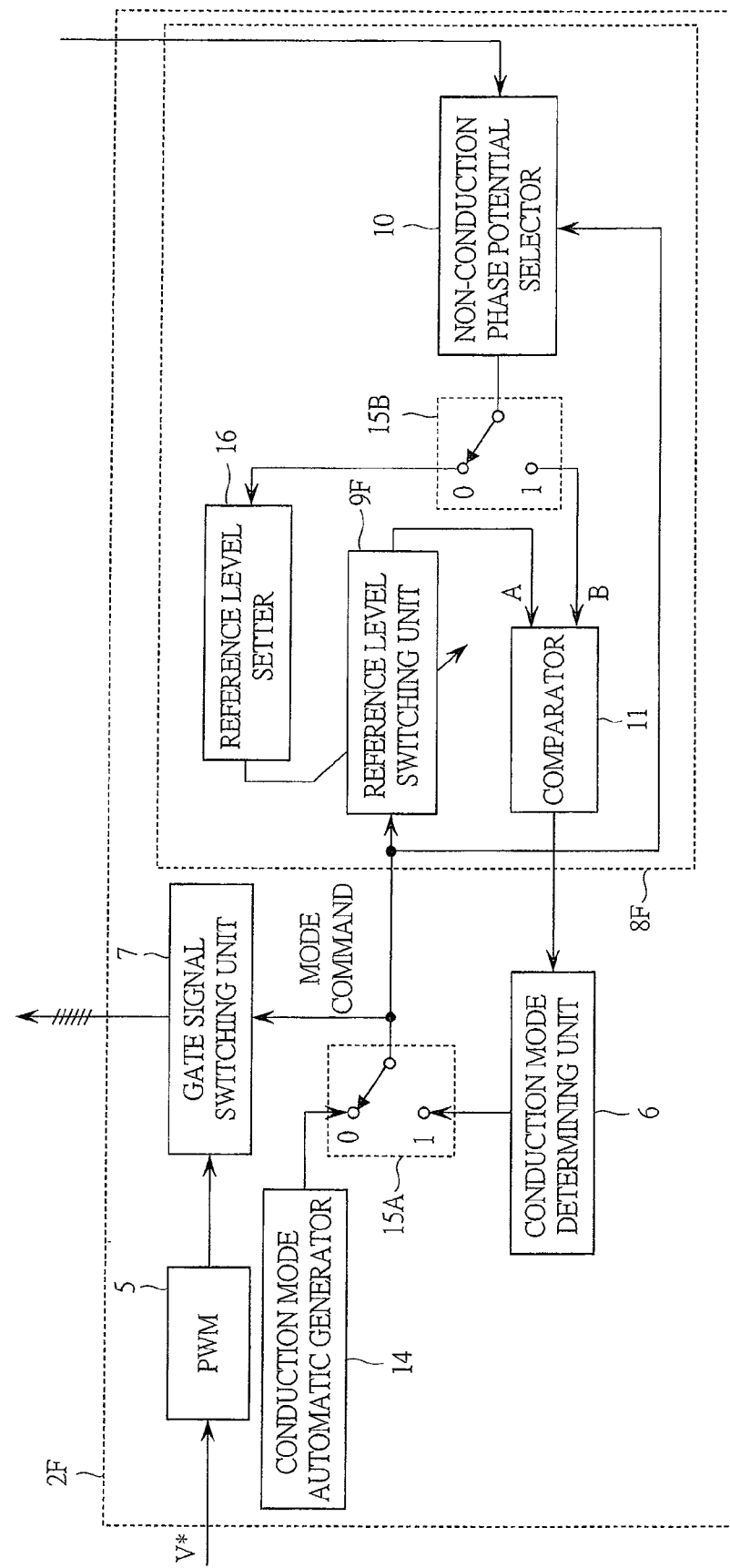
FIG. 17 is a block diagram showing a controller according to the eighth embodiment.

FIG. 17 is a block diagram showing a controller 2F according to the present embodiment. The controller 2F of the present embodiment is characterized by including a reference level switching unit 9F, a conduction mode automatic generator 14, switches 15A and 15B and a reference level setter 16.

In this embodiment, two operation states such as a normal drive state and an automatic adjusting state are present. The switches 15A and 15B function to make the settings of the operation state based on a signal (not shown) for specifying the operation state, and the "0" side indicates the automatic adjusting state and the "1" side indicates the normal drive state.

The reference level switching unit 9F is the same as the reference level switching unit 9 in that it switches and outputs Vhp and Vhn in accordance with the mode command outputted from the conduction mode determining unit 6. However, the reference level switching unit 9F is different from the reference level switching unit 9 in that it can change the values of Vhp and Vhn in response to the operation of the reference level setter 16.

The conduction mode automatic generator 14 is a circuit which sequentially outputs a pseudo mode command signal during the automatic adjusting state.

The reference level setter 16 is a circuit which records the potential of the non-conduction phase in the automatic adjusting state and instructs the reference level switching unit 9F to set Vhp and Vhn.

Next, the operation of the controller 2F will be described.

First, the switches 15A and 15B enter the automatic adjusting state based on the signal (not shown) for specifying the operation state. In the automatic adjusting state, the pseudo mode command signal is sequentially outputted in open loop from the conduction mode automatic generator 14, and the motor is driven in open loop. At this time, the potential of the non-conduction phase is recorded in the reference level setter 16. The values of Vhp and Vhn in the reference level switching unit 9F are set based on the data recorded in the reference level setter 16.

After the completion of the setting, the two switches 15A and 15B are switched to the "1" side. Thereafter, the sensorless driving is performed in the normal driving state.

According to the present embodiment, the setting operation of the reference level in accordance with the motor can be automated and the operating efficiency can be improved.

Ninth Embodiment

Next, the ninth embodiment of the present invention will be described.

The embodiments of the present invention described above are those obtained by improving the 120 degree conduction sensorless system. At present, however, the mainstream of the drive system of the permanent magnet motor has been shifting to the 180 degree conduction system by the sine wave current.

On the other hand, the position estimation at extremely low speed is difficult in the 180 degree conduction system. Therefore, it is desired that the 120 degree conduction sensorless system is used at the activation and it is switched to the sine wave driving after a certain acceleration.

Figure 18:
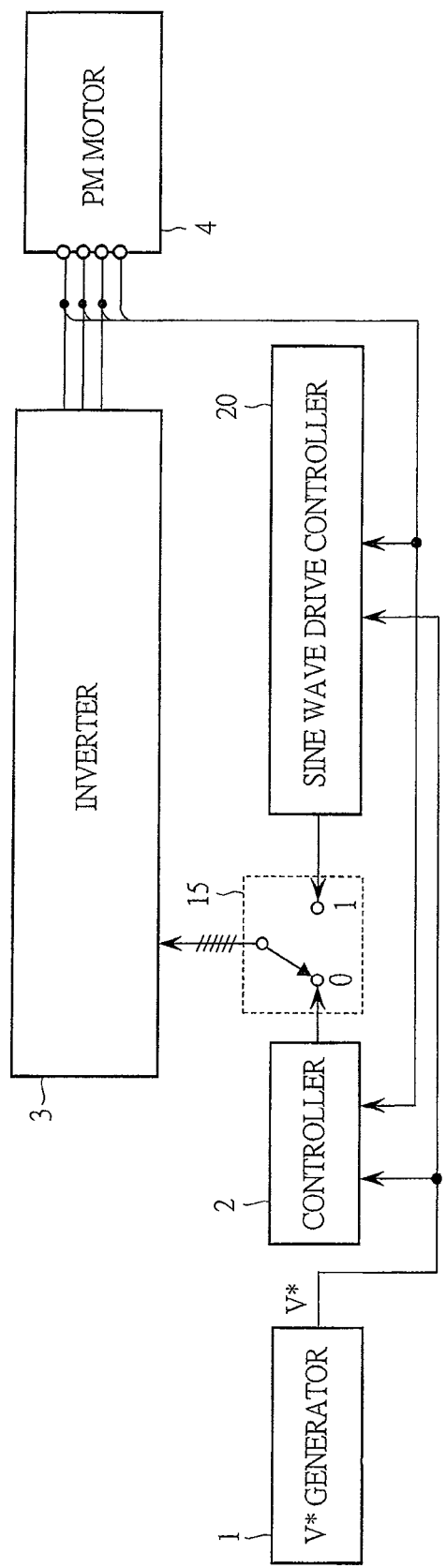
FIG. 18 is a block diagram showing the configuration of the drive system of the permanent magnet motor according to the ninth embodiment.

FIG. 18 is a block diagram showing the configuration of the motor drive system according to the ninth embodiment of the present invention. In the present embodiment, a sine wave drive controller 20 and the controller 2 according to the present invention are switched by the switch 15 in accordance with the rotation speed range.

In this manner, the high-quality motor drive system can be realized.

Tenth Embodiment

Next, the tenth embodiment of the present invention will be described.

In the foregoing embodiments, the position is specified by using the speed electromotive force. Therefore, there arises the problem that the measurement cannot be made when the rotator of the permanent magnet motor is completely stopped.

The tenth embodiment of the present invention intends to carry out the activation from the stopped state by using the present invention and the conventional technology in combination.

Figure 19:
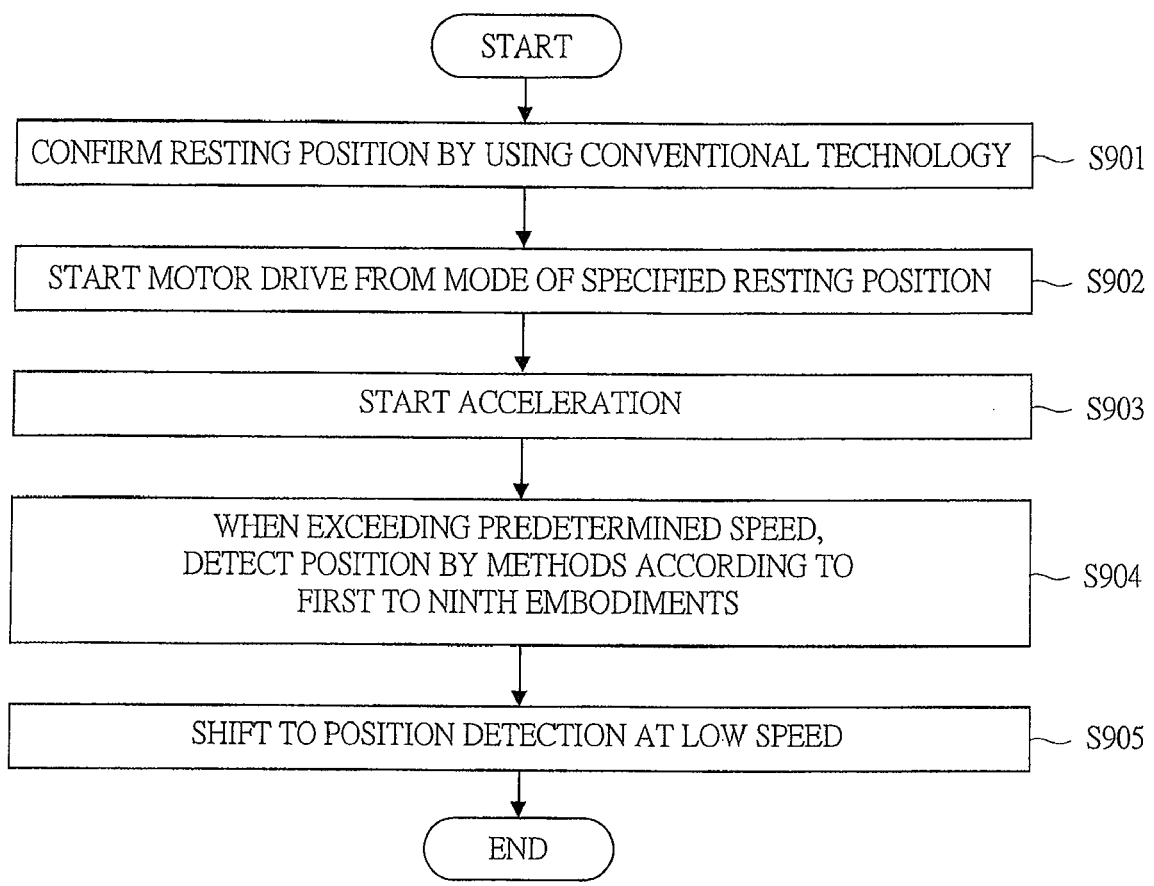
FIG. 19 is a flowchart showing the process from the resting state of the drive system of the permanent magnet motor according to the tenth embodiment.

FIG. 19 is a flowchart showing the process from the resting state of the drive system of the permanent magnet motor according to the present embodiment. The operation in this embodiment will be described with reference to this flowchart. Note that these processes are carried out in the control circuit (not shown) of the motor drive system.

First, the position information of the permanent magnet motor 4 in a stopped state is acquired using the conventional technologies of the patent document 2, the patent document 3 and others (step S901). When the position information is specified in this step S901, the control circuit (not shown) specifies the mode of the permanent magnet motor 4 from the specified position information (step S902).

When the mode of the permanent magnet motor 4 is specified, the acceleration of the permanent magnet motor 4 is started based on it (step S903). Then, when a predetermined acceleration is obtained, the control is switched to that described in other embodiments of the present invention, thereby switching to the process in the extremely low-speed state described in this specification (step S904).

In this manner, the present invention can be applied not only to the extremely low-speed state but also to the resting state.

Eleventh Embodiment

Next, the eleventh embodiment of the present invention will be described.

Figure 20:
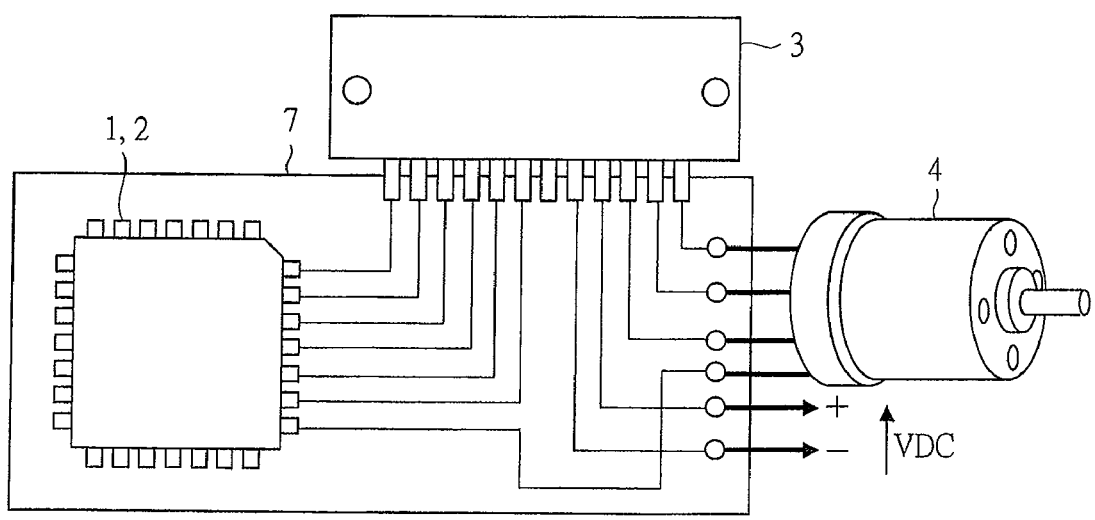
FIG. 20 is an actual diagram of the drive system of the permanent magnet motor according to the eleventh embodiment.

FIG. 20 is an actual diagram of the drive system of the permanent magnet motor according to the present embodiment. In FIG. 20, the V* generator 1 and the controller 2 are realized by one integrated circuit. The inverter 3 is driven by the PWM pulse waveform outputted from the integrated circuit.

In the inverter 3, the inverter main circuit unit 32 and the output pre-driver 33 are integrated (single-packaged). By this means, the size reduction can be achieved.

Further, by forming the portion of the controller 3 into the general-purpose LSI, it can be applied to various uses (capacitor).

Figure 21:
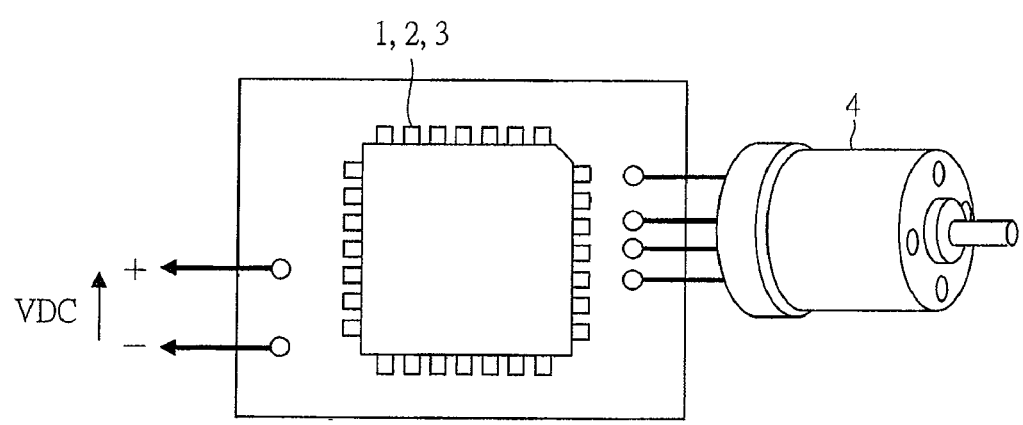
FIG. 21 is an actual diagram of another drive system of the permanent magnet motor according to the eleventh embodiment.

FIG. 21 is an actual diagram of another drive system of the permanent magnet motor according to the present embodiment. The V* generator 1, the controller 2 and the inverter 3 are packaged into one chip. In the present embodiment, by connecting the permanent magnet motor 4 to a power supply, the variable speed driving of the permanent magnet motor 4 can be realized, and when a small-sized motor is to be driven, the total size of the system can be reduced.

Also, when the part corresponding to the controller is formed into an integrated circuit, the high-speed computing with the computing rate of several to several 10 µs or less can be realized.

In the present embodiment, complicated computing is not required in each case, and therefore, the sensorless driving from the low speed can be realized without increasing the number of gates. When a microcomputer and DSP are used for the control, the speeding up of the computing process is difficult. However, by forming the controller as a dedicated integrated circuit, this problem can be significantly alleviated, and the effect of the present invention can be enhanced.

In the foregoing, the invention made by the inventors of the present invention has been concretely described based on the embodiments. However, it is needless to say that the present invention is not limited to the foregoing embodiments and various modifications and alterations can be made within the scope of the present invention.

As described above, the present invention is the technology directed to the establishment of a sensorless motor drive system. This motor can be applied to the driving of a hard disk drive and the rotation speed control of HVAC equipment, an optical disk driver, a spindle motor, a fan, a pump, a compressor and others.

What is claimed is:

1. A drive system of a synchronous motor comprising:
   a three-phase synchronous motor;
   an inverter connected to the three-phase synchronous motor and having a plurality of switching elements; and
   a controller which selects two conducting phases from a three-phase winding of the three-phase synchronous motor and performs conduction control of the inverter in six conduction modes by a pulse width modulation operation,
   wherein the controller is provided with means of detecting at least one of a terminal potential of a non-conduction phase and a connecting point potential (neutral point potential) of a stator winding of the three-phase synchronous motor, sampling the detected value in synchronization with a conduction pulse of a conduction phase, and computing an absolute value of the sampled value and means of comparing the absolute value of the sampled value and a reference voltage in terms of level and sequentially switching the conduction mode in accordance with a result of the level comparison.

2. The drive system of a synchronous motor according to claim 1, further comprising:
   a virtual neutral point generator,
   wherein the comparison with the reference voltage in terms of level is performed with using a potential difference between a virtual neutral point potential of the virtual neutral point generator and the potential of the non-conduction phase or the neutral point potential.

3. The drive system of a synchronous motor according to claim 1, further comprising:
   a reference voltage level switching unit; and
   means of deriving the number of rotations of the three-phase synchronous motor based on a switching cycle of the conduction mode,
   wherein the reference voltage level switching unit changes the reference voltage based on the number of rotations of the three-phase synchronous motor.

4. The drive system of a synchronous motor according to claim 3,
   wherein the reference voltage level switching unit increases a magnitude of the reference voltage as the number of rotations of the three-phase synchronous motor increases.

5. The drive system of a synchronous motor according to claim 1,
   wherein, as switching operations of two phases conducting to the three-phase synchronous motor, the switching operations are mutually complementary operations.

6. The drive system of a synchronous motor according to claim 1, further comprising:
   a function to drive the three-phase synchronous motor in open loop before driving the drive system and hold a potential difference detection value generated at this time,
   wherein a set value of the reference voltage is determined based on the held value.

7. The drive system of a synchronous motor according to claim 1, further comprising:
   a non-conduction phase potential selector,
   wherein the non-conduction phase potential selector sets a sampling timing to a latter half of a conduction period.

8. The drive system of a synchronous motor according to claim 1,
   wherein the drive system is adopted from a stopped state of the synchronous motor or the number of rotations close to the stopped state up to the intermediate number of rotations before reaching the highest number of rotations, and it is switched to a 120 degree conduction drive system for detecting an induced voltage or a drive system by a sine wave current in the higher number of rotations.

9. The drive system of a synchronous motor according to claim 1,
   wherein the inverter and the controller are formed on the same semiconductor substrate.

* * * * *